(12) United States Patent
Chang et al.

(10) Patent No.: US 10,204,295 B1
(45) Date of Patent: Feb. 12, 2019

(54) RFID SECURITY DOCUMENT

(71) Applicants: Kuo-Hsin Chang, Chiayi County (TW); Jia-Cing Chen, Tainan (TW); Chung-Ping Lai, Hsinchu County (TW)

(72) Inventors: Kuo-Hsin Chang, Chiayi County (TW); Jia-Cing Chen, Tainan (TW); Chung-Ping Lai, Hsinchu County (TW)

(73) Assignee: Graphene Security Limited, Hsinchu (TW)

( * ) Notice: Subject to any disclaimer, the term of this patent is extended or adjusted under 35 U.S.C. 154(b) by 0 days.

(21) Appl. No.: 15/702,128

(22) Filed: Sep. 12, 2017

(51) Int. Cl.
| | |
|---|---|
| *G06K 19/06* | (2006.01) |
| *G06K 19/077* | (2006.01) |
| *C09D 11/52* | (2014.01) |
| *C09D 11/30* | (2014.01) |

(52) U.S. Cl.
CPC ........ *G06K 19/07722* (2013.01); *C09D 11/30* (2013.01); *C09D 11/52* (2013.01); *G06K 19/07798* (2013.01)

(58) Field of Classification Search
CPC ............. G06K 19/025; G06K 7/10316; G06K 19/0776; G06K 19/07777; H05K 3/12
See application file for complete search history.

(56) References Cited

U.S. PATENT DOCUMENTS

| | | | |
|---|---|---|---|
| 2007/0257797 A1 | 11/2007 | Rancien et al. | |
| 2008/0000986 A1* | 1/2008 | Onishi | G06K 19/07749 235/492 |
| 2009/0051541 A1 | 2/2009 | Peng et al. | |
| 2014/0151607 A1* | 6/2014 | Lowenthal | C09D 11/101 252/503 |

FOREIGN PATENT DOCUMENTS

CN 103353945 A 10/2013

\* cited by examiner

*Primary Examiner* — Hongmin Fan

(57) ABSTRACT

A RFID security structure for a document contains: a RFID antenna and a RFID chip. The RFID antenna is made of conductive inks printed on the document, and the RFID chip is attached on and is electrically connected with the RFID antenna. When the covering layer is removed from the document, the RFID antenna is broken. Accordingly, a portion of the RFID antenna attaches on the covering layer, and the other portion of the PRID antenna remains on the RFID security document or the substrate, hence the RFID security document is not tampered or is not imitated.

13 Claims, 4 Drawing Sheets

RFID SECURITY DOCUMENT

FIELD OF THE INVENTION

The present invention relates to a RFID security document which is distinguished easily and is not copied easily.

BACKGROUND OF THE INVENTION

A conventional anti-counterfeiting technology is widely applied for physical documents, such as banknotes, documents (i.e. identity cards and driver's licenses), securities, stamps, and papers (such as contracts, certificates, and confidential files).

The anti-counterfeiting technology contains printing manner by way of discoloration ink, optically variable ink, fluorescent oil, however, when the physical documents are printed in the anti-counterfeiting technology, it is troublesome to be distinguished.

Electronic equipment is used to distinguish radio frequency identification (RFID) tag, and the RFID tag contains an antenna and a chip configured to save digital data, and a transceiver/reader for transmitting and receiving radio waves is attached on the RFID tag of a security document, such that the digital data in the chip is distinguished, saved, and read.

Structure including an electronic device for fabricating a security document or a document of value is disclosed in US Publication No. 20070257797 A1, wherein the structure contains a RFID tag, and the RFID tag has a RFID chip and a RFID antenna adhered on the RFID tag. However, the structure is complicated and has high thickness.

A RFID certified document and its preparing method are disclosed in US Publication No. US20090051541 A1, wherein an antenna is printed on a blank authentication document in which data is printed, a chip is fixed between two terminals of the antenna, and a steel stamp is stamped on the chip. Nevertheless, the chip is embezzled easily.

A RFID security driving license is disclosed in CN Publication No. 103353945 A and contains a paper substrate and a RFID structure connecting with the paper substrate, wherein the RFID structure has a connection layer, a RFID antenna, and a RFID chip. The connection layer is adhered on the paper substrate, but it is replaceable easily.

The present invention has arisen to mitigate and/or obviate the afore-described disadvantages.

SUMMARY OF THE INVENTION

The primary objective of the present invention is to provide a RFID security document which is distinguished easily and is not copied easily.

To obtain above-mentioned objective, a RFID security document provided by the present invention contains: a RFID antenna and a RFID chip.

The RFID antenna is made of conductive inks printed on the substrate, and the RFID chip is attached on and is electrically connected with the RFID antenna.

Preferably, the substrate is a paper or a plastic sheet, and the plastic sheet is any one of polyethylene terephthalate (PET), polyvinylchloride (PVC), polycarbonate (PC), polyethylene (PE), and polypropylene (PP).

Preferably, the conductive inks of the RFID antenna include carbon material and conductive metal filler.

Preferably, the graphene and the conductive metal filler are mixed at a predetermined ratio.

Preferably, the carbon material is any one of graphite, graphene, carbon tube, carbon rod, and carbon black.

Preferably, the conductive metal filler is any one of silver, gold, platinum, copper, nickel, and alloy or composite of at least two of silver, gold, platinum, copper, and nickel.

The RFID security document further contains an adhesive layer and a covering layer, wherein the adhesive layer is located at a position of the substrate on which the RFID antenna is printed, the RFID antenna is printed on the adhesive layer, and the covering layer covers on the RFID antenna and the RFID chip.

In another embodiment, a RFID security structure for a document contains: a RFID antenna and a RFID chip.

The RFID antenna is made of conductive inks printed on the document, and the RFID chip is attached on and being electrically connected with the RFID antenna.

Preferably, the conductive inks of the RFID antenna include carbon material and conductive metal filler.

Preferably, the graphene and the conductive metal filler are mixed at a predetermined ratio.

Preferably, the carbon material is any one of graphite, graphene, carbon tube, carbon rod, and carbon black.

Preferably, the conductive metal filler is any one of silver, gold, platinum, copper, nickel, and alloy or composite of at least two of silver, gold, platinum, copper, and nickel.

Preferably, the RFID security structure further contains an adhesive layer and a covering layer, wherein the adhesive layer is located at a position of the substrate on which the RFID antenna is printed, the RFID antenna is printed on the adhesive layer, and the covering layer covers on the RFID antenna and the RFID chip.

Preferably, the covering layer is a paper or a plastic sheet.

Preferably, the plastic sheet is any one of polyethylene terephthalate (PET), polyvinylchloride (PVC), polycarbonate (PC), polyethylene (PE), and polypropylene (PP).

DETAILED DESCRIPTION OF THE PREFERRED EMBODIMENTS

Figure 1:
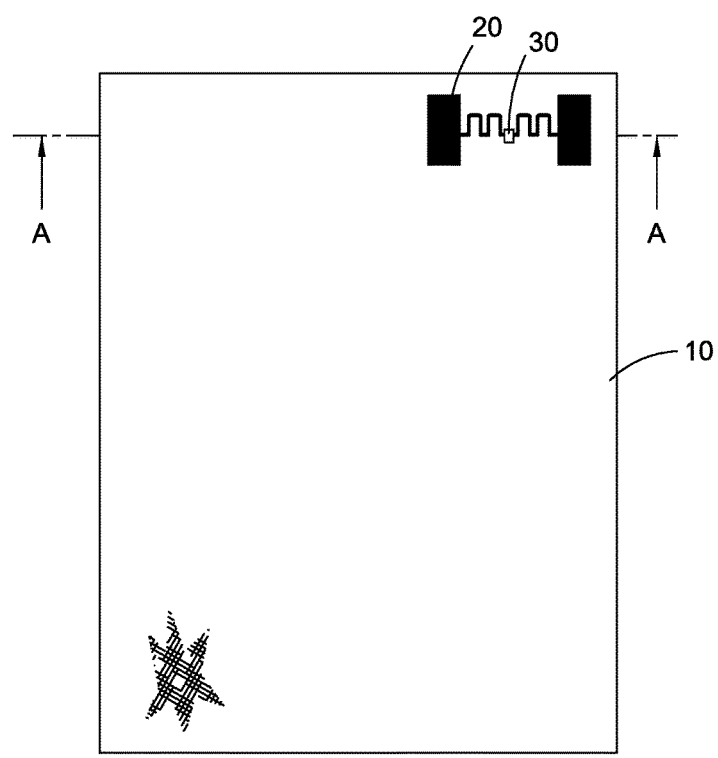
FIG. 1 is a plan view showing the assembly of a RFID security document according to a first embodiment of the present invention.
Figure 2:
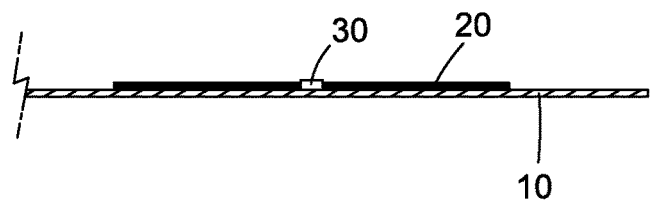
FIG. 2 is a cross sectional view taken along the line A-A of FIG. 1.

With reference to FIGS. 1 and 2, a RFID security document according to a first embodiment of the present invention comprises: a substrate 10, a RFID antenna 20, and a RFID chip 30.

The substrate 10 is a carrier for carrying data, and the data is printed on the substrate 10, wherein the substrate 10 is a paper or a plastic sheet. Preferably, the plastic sheet is any one of polyethylene terephthalate (PET), polyvinylchloride (PVC), polycarbonate (PC), polyethylene (PE), and polypropylene (PP).

The RFID antenna 20 is made of conductive inks printed on the substrate 10, and the RFID chip 30 is attached on and is electrically connected with the RFID antenna 20, wherein the RFID chip 30 is mounted on the substrate 10 or a part of the RFID antenna 20, and the RFID antenna 20 and the RFID chip 30 are bonded together by using conductive silver so that the RFID antenna 20 is electrically connected with the RFID chip 30. The conductive inks of the RFID antenna 20 include carbon material and conductive metal filler, wherein the carbon material is any one of graphite, graphene, carbon tube, carbon rod, and carbon black, wherein the conductive metal filler is any one of silver, gold, platinum, copper, nickel, and alloy or composite of at least two of silver, gold, platinum, copper, and nickel.

Preferably, the graphene and the conductive metal filler are mixed at a predetermined ratio so as to use as a mixing ratio of the conductive inks of the RFID antenna 20, such as a mixing ratio of the carbon material and the conductive metal filler of the conductive inks of the RFID antenna 20.

Preferably, the mixing ratio of the carbon material and the conductive metal filler of the conductive inks of the RFID antenna 20 is adjustable so as to change security mechanisms. For example, as printing the RFID antenna 20 from the conductive inks and a mixing ratio of conductive carbon powder and metal powders of the conductive metal filler is C/metal=1 to 1.2, the RFID security document is true. In another embodiment, when a mixing ratio of conductive carbon powder and metal powders of the conductive metal filler is C/metal=0.5, the RFID security document is true. Preferably, the mixing ratio of the conductive inks of the RFID antenna 20 is tested by a variety of analysis equipment (such as energy dispersive spectrometer (EDX) or X-ray photoelectron spectroscopy (XPS)). Thereby, the RFID chip 30 is applied to record the data, thus obtaining security of the RFID security document and the data. Preferably, the mixing ratio of the conductive inks of the RFID antenna 20 is employed to distinguish whether the RFID security document is true or fake.

Figure 3:
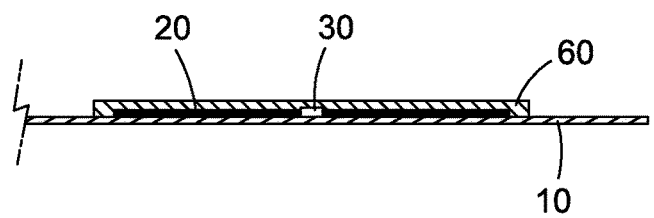
FIG. 3 is a cross sectional view showing the assembly of the RFID security document according to the first embodiment of the present invention.

Referring to FIG. 3, a protective layer 60 covers on the RFID antenna 20 and the RFID chip 30, wherein the protective layer 60 is formed, after applying glue on the RFID antenna 20 and the RFID chip 30.

Figure 4:
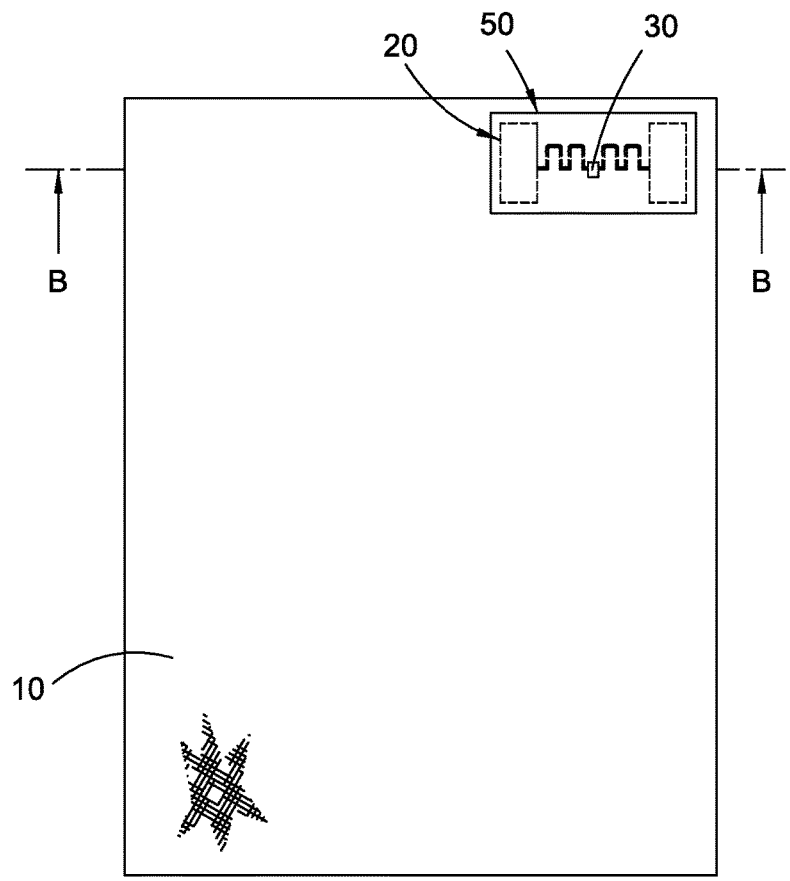
FIG. 4 is a plan view showing the assembly of a RFID security document according to a second embodiment of the present invention.
Figure 5:
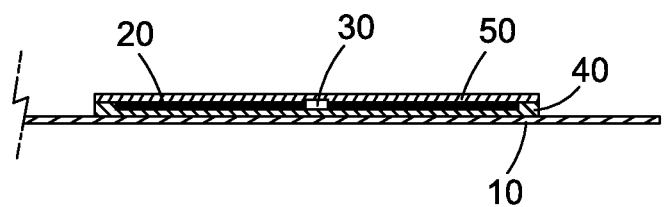
FIG. 5 is a cross sectional view taken along the line B-B of FIG. 4.

As shown in FIGS. 4 and 5, a difference of a RFID security document of a second embodiment from that of the first embodiment comprises: an adhesive layer 40 and a covering layer 50, wherein the covering layer 50 is a paper or a plastic sheet. The adhesive layer 40 is located at a position of the substrate 10 on which the RFID antenna 20 is printed, i.e. the RFID antenna 20 is printed on the adhesive layer 40, wherein the adhesive layer 40 is any one of hot melt adhesive, acrylic resin, and silicone resin. The covering layer 50 covers and adheres on the RFID antenna 20 and the RFID chip 30, hence the RFID security document cannot be copied.

Figure 6:
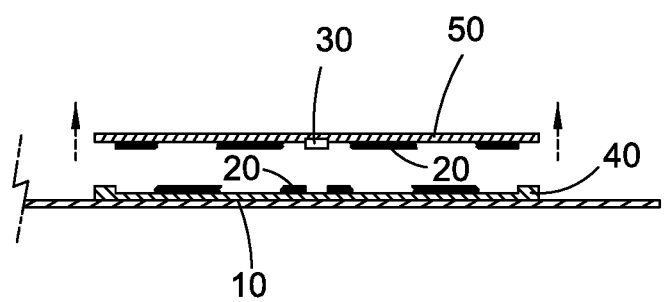
FIG. 6 is a cross sectional view showing the operation of the RFID security document according to the second embodiment of the present invention.

As illustrated in FIG. 6, when the covering layer 50 is removed from the RFID security document or the substrate 10, the RFID antenna 20 is broken. Accordingly, a portion of the RFID antenna 20 attaches on the covering layer 50, and the other portion of the PRID antenna 20 remains on the RFID security document or the substrate 10, hence the RFID security document is not tampered or is not imitated.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A RFID security document comprising: a substrate, a RFID antenna, a RFID chip, an adhesive layer, and a covering layer;
   the RFID antenna being made of conductive inks printed on the substrate, and the RFID chip being attached on and being electrically connected with the RFID antenna;
   wherein the adhesive layer is located at a position of the substrate on which the RFID antenna is printed, the RFID antenna is printed on the adhesive layer, and the covering layer covers on the RFID antenna and the RFID chip.

2. The RFID security document as claimed in claim 1, wherein the substrate is a paper or a plastic sheet, and the plastic sheet is any one of polyethylene terephthalate (PET), polyvinylchloride (PVC), polycarbonate (PC), polyethylene (PE), and polypropylene (PP).

3. The RFID security document as claimed in claim 1, wherein the conductive inks of the RFID antenna include carbon material and conductive metal filler.

4. The RFID security document as claimed in claim 3, wherein a graphene and the conductive metal filler are mixed at a predetermined ratio.

5. The RFID security document as claimed in claim 4, wherein the carbon material is any one of graphite, graphene, carbon tube, carbon rod, and carbon black.

6. The RFID security document as claimed in claim 4, wherein the conductive metal filler is any one of silver, gold, platinum, copper, nickel, and alloy or composite of at least two of silver, gold, platinum, copper, and nickel.

7. A RFID security structure for a document comprising: a RFID antenna, a RFID chip, an adhesive layer and a covering layer;
   the RFID antenna being made of conductive inks printed on the document, and the RFID chip being attached on and being electrically connected with the RFID antenna;
   wherein the adhesive layer is located at a position of the substrate on which the RFID antenna is printed, the RFID antenna is printed on the adhesive layer, and the covering layer covers on the RFID antenna and the RFID chip.

8. The RFID security structure as claimed in claim 7, wherein the conductive inks of the RFID antenna include carbon material and a conductive metal filler.

9. The RFID security structure as claimed in claim 8, wherein a graphene and the conductive metal filler are mixed at a predetermined ratio.

10. The RFID security structure as claimed in claim 9, wherein the carbon material is any one of graphite, graphene, carbon tube, carbon rod, and carbon black.

11. The RFID security structure as claimed in claim 9, wherein the conductive metal filler is any one of silver, gold, platinum, copper, nickel, and alloy or composite of at least two of silver, gold, platinum, copper, and nickel.

12. The RFID security structure as claimed in claim 7, wherein the covering layer is a paper or a plastic sheet.

13. The RFID security structure as claimed in claim 12, wherein the plastic sheet is any one of polyethylene terephthalate (PET), polyvinylchloride (PVC), polycarbonate (PC), polyethylene (PE), and polypropylene (PP).

\* \* \* \* \*